Dec. 8, 1931.  C. R. MUELLER  1,835,512
THERMOSTATIC CONTROL
Filed Sept. 28, 1927
Fig. 1
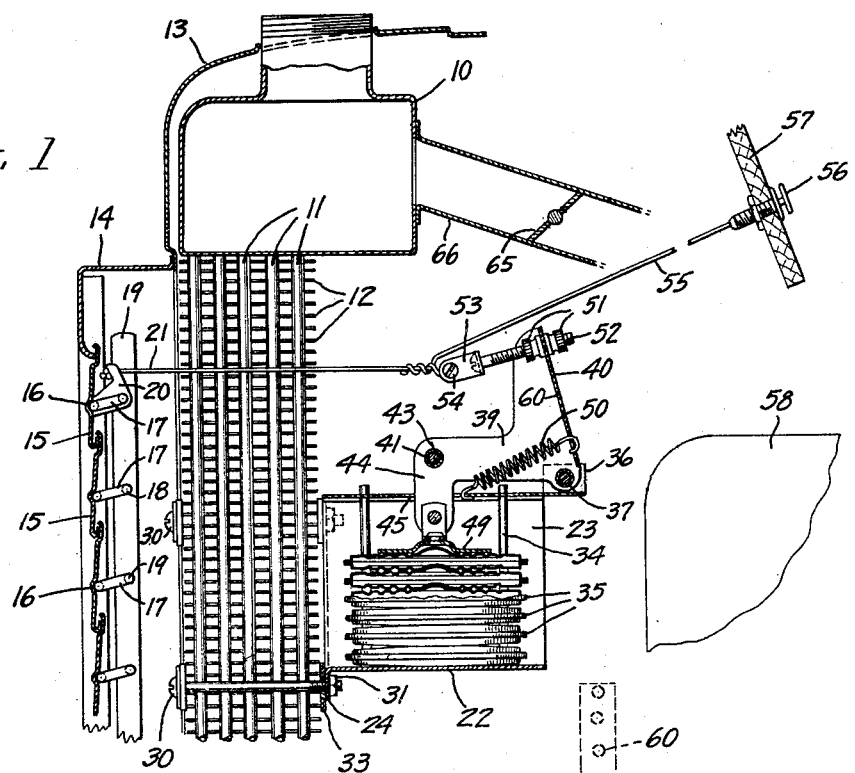
Fig. 2
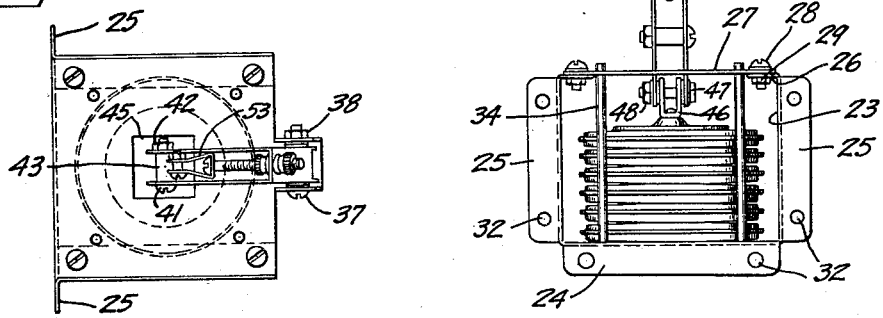
Fig. 3
Fig. 4
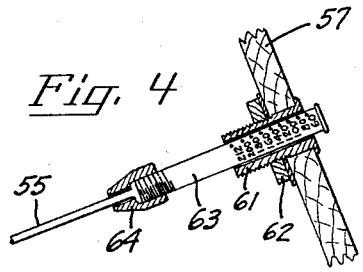
Inventor
Christian R. Mueller
By *[signature]*
Attorney Patented Dec. 8, 1931

1,835,512

UNITED STATES PATENT OFFICE

CHRISTIAN R. MUELLER, OF HIGHLAND PARK, MICHIGAN

THERMOSTATIC CONTROL

Application filed September 28, 1927. Serial No. 222,500.

This invention relates to temperature controlled means and particularly to that type wherein a thermostat is provided for controlling the position of ventilating shutters of any type, or mixing or other similar valves in circulating systems on vehicles not provided with shutters, or for any purpose in which a temperature control may be employed, as in refrigerators, dryers, heating and ventilating systems, boiler flue gas or steam apparatus or, in fact, any device where fluid is circulated, the principal object being the provision of a new and novel construction therefor.

Another object is to provide a thermostatically controlled device for controlling the position of the ventilating shutter for the radiator of a motor vehicle and the like, wherein the air passing through the radiator is employed as the heat carrying medium for actuating the thermostatic element.

Another object is the provision of a thermostatically controlled device for governing the flow of air through a radiator, the thermostatic element of which is positioned in the path of flow of such air.

A further object is to provide a new and novel device for controlling shutters used in conjunction with radiators and the like, such device being simple in construction, efficient in operation and economical to manufacture.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several views,—

Fig. 1 is a more or less diagrammatic sectional view taken centrally through the radiator of a motor vehicle, such radiator being provided with shutters for controlling the flow of air through the same, the shutters being controlled by a device constructed in accordance with the present invention, said device also being shown in section.

Fig. 2 is a plan view of the thermostatic device shown in Fig. 1.

Fig. 3 is a front elevation of Fig. 2.

Fig. 4 is a fragmentary sectional view indicating a manner in which the device may be employed for indicating temperatures.

Thermostatically controlled shutters for the radiators of motor vehicles and for other like purposes are relatively common and well known. In the conventional constructions employed in connection with the radiators of motor vehicles, the thermostatic element is usually positioned in closely adjacent relationship with the radiator water header and is protected by a casing, or in some other manner, from a direct flow of air upon the same, so that the heat transmitted to the thermostatic element for the purpose of actuating it is invariably by a conduction only and in such manner that the thermostatic element is heated non-uniformly. The result is that in the conventional constructions a relatively long period of time is required before sufficient heat has been transmitted to the thermostatic element to actuate the same whereby it will cause the shutter to be opened and allow air to pass through the radiator for the purpose of cooling the water flowing through the same. In fact, it is a common occurrence in cases where the radiator contains a mixture of alcohol and water that before sufficient time has elapsed to open the shutters the mixture has reached a temperature higher than the boiling point of the mixture, with the result that considerable alcohol is boiled off and discharged from the radiator with the resulting loss of the same.

In the present invention I provide a construction in which heat is transferred to the thermostatic element by conduction, convection and radiation, taking advantage of all known methods of heat transfer and making the same extremely sensitive to the temperature variations of the radiator and providing a construction whereby such loss of alcohol as previously described is substantially obviated. I do this by employing as a thermostatic element a plurality of thermostatic discs so formed and positioned that the air passing through the radiator contacts simultaneously with substantially the entire surface of all the discs which are quickly affected by temperature changes of such air and are actuated accordingly. The present construction has the further property of becoming more sensitive as the temperature increases. This is due to the fact that the heat transmitted by the heat transmitting fluid to the discs by convection increases approximately as the square of its velocity while the heat transfer by radiation or conduction remains approximately the same for a given difference in temperature throughout a relatively wide variation. The velocity of the fluid is assumed in the present case by reason of the duct-like construction of the thermostat.

As indicative of the present invention I show in the drawings a radiator of conventional type employed in motor vehicles, comprising a water header 10 from which a plurality of tubes 11 project vertically downward and are joined to the lower water header (not shown). The usual fins 12 are provided around the tubes 11 for the purpose of accelerating the transfer of heat between the tubes and the air passing around the same. The usual ornamental shell 13 is provided around the radiator, the shell being provided with the usual open front permitting the passage of air around the tubes 11. Secured to the outer face of the shell 13 over the ventilating opening therein is a radiator shutter comprising a frame 14 and a plurality of cooperative shutters or shutter strips 15 pivotally supported at 16, each shutter strip 15 being provided with a rearwardly extending arm 17 rigidly secured thereto at one end. The opposite ends of the arms 17 are pivotally secured at 18 to a vertically extending bar 19 which acts to tie all of the shutter strips together so as to function simultaneously. One of the arms 17 may be provided with a bell crank member 20 to which a control wire or rod such as 21 is secured for the purpose of actuating the shutter strips 15.

In accordance with the present invention I show a thermostatic device for actuating the wire 21 to control the pivotal position of the shutter strips 15 so as to maintain a predetermined temperature of cooling fluid within the radiator. This device comprises a supporting casing formed from sheet metal to provide a bottom wall 22 and side walls 23. The forward edge of the bottom wall 22 is bent downwardly perpendicular to the plane of the bottom wall to provide an attaching flange 24 and the forward edges of the side walls 23 are bent outwardly perpendicular to the plane of the side walls to form attaching flanges 25. The upper edges of the side walls 23 are bent inwardly to provide attaching flanges 26 for the top wall 27 which is removably secured thereto by the screws 28 and nuts 29. This casing which is open at its front and back, is secured to the rear face of the radiator by the screws 30 and nuts 31, the screws 30 projecting from the front to the rear of the radiator and extending through the openings 32 provided in the flanges 24 and 25, a suitably resilient gasket such as 33 being preferably provided between the flanges 24 and 25 and the adjacent edges of the fins 12 to prevent damage to the latter. Secured to the bottom wall 22 and extending upwardly therefrom through the openings in the top wall 27 which freely receive the same are a plurality of rods 34 spaced from each other to form a vertically extending cage between the same. Loosely received within the cage formed by the rods 34 are a plurality of thermostatic elements 35, these elements being formed of relatively thin sheet metal into a disc-like form and preferably containing a suitable volatile liquid which is suitably sealed from escape from the elements 35. The elements 35 are preferably of less thickness at their peripheries than at their centers, each element being provided with a restricted centering boss in one surface and with a corresponding concavity in the opposite surface, adapting adjacent elements to interfit in a restricted area where they contact against each other, in order to provide a space between substantially the entire surface of each adjacent element for the purpose of allowing circulation of air between the same.

Projecting rearwardly from the top wall 27 is a supporting bracket having spaced side walls 36 joined at their lower edges by a bottom wall, this bracket being formed from the metal of the top wall itself. Pivotally secured between the side walls 36 by the screw 37 which is held against displacement by the nut 38, is a bell crank member having spaced parallel side portions 39 connected together along one edge by the transversing wall 40, the bell crank member being formed from a suitable piece of sheet metal bent to the shape shown. The horizontally extending legs of the bell crank are anchored against spreading by the screw 41 and nut 42, and are held in spaced relationship by the sleeve 43 which surrounds the screw 41 between the side portions 39. Projecting downwardly from the free end of the horizontally extending portions of the side walls 39 are the two arm portions 44 which project freely through the central opening 45 in the top wall 27 and to the lower end of which the U-shaped member 46 is secured by the screw 47 and the nut 48. The U-shaped member 46 is rigidly connected to the center of a disc 49 which rests against the upper surface of the upper thermostatic element 35. A spring 50, held under tension between the cross wall 40 of the bell crank and an edge of the opening 45, tends to turn the bell crank in an anticlockwise direction as viewed in Fig. 1, whereby to clamp the thermostatic elements 35 between the disc 49 and the bottom wall 22 of the casing. This spring may have sufficient strength to close the shutters as the motion of the bell crank follows the discs in contracting, or it may simply serve to prevent the discs from rattling, or to keep them in place if the device is inverted. Adjustably secured to the upper end of the cross wall 40 of the bell crank by the nuts 51 is the screw 52, the head of which is provided with a swiveled yoke 53, the free ends of which are provided with a cross pin 54 to which the wire 21 is secured. If desired another wire such as 55 may be provided between the pin 54 and a frictionally controlled button such as 56 secured to the instrument board 57 of the motor vehicle of which the device may form a part.

The device may be readily adapted to serve as a temperature indicating device. This may be accomplished on a motor vehicle by securing a sleeve such as 61 in the instrument board 57 of the vehicle by a nut such as 62 and providing a sliding member 63 therein upon which suitable temperature indications are provided, and connecting the member 63 to the rod 55 by a nut such as 64. In such a case the wire or rod 55 must be made sufficiently rigid to guard against bending of the same and suitable means may be provided for adjusting the length of the rod to show the correct reading of the member 63 with respect to the face of the sleeve 61. The movement of the bell crank in such a case will cause like movement of the member 63 which will be caused to project past the face of the sleeve 61 an amount corresponding to the temperature of the air in contact with the discs 35 and this temperature will be readily determined by the reading on the member 63.

The operation of the device is as follows: Supposing that the liquid in the radiator and the engine, which is positioned immediately behind the radiator and is shown diagrammatically at 58 in Fig. 1, is cold, and the engine is started up, the liquid will immediately begin to rise in temperature, the radiator shutter being in closed position. Not only will air between the engine and the radiator become warm and thus transfer heat by conduction and convection to the thermostatic element 35, but the same will also receive heat by radiation from the engine and radiator, and the air being in contact with substantially the full area of the thermostatic elements 35 as previously described will cause the elements to be quickly expanded, as soon as the air reaches a predetermined temperature value which corresponds to a temperature of liquid within the radiator of a predetermined value, which of course will be slightly higher than the temperature of air. The thermostatic elements 35 are preferably filled with a volatile liquid of such characteristics that the maximum rate of expansion or volatilization of the same occurs at approximately that predetermined temperature of air passing through the radiator which will hold the temperature of the liquid within the radiator at the desired predetermined value. As soon as the elements 35 begin to expand, the end 44 of the bell crank will be lifted, causing the bell crank to pivot about the pin 37, the end of the upwardly extending arm portion of the same moving inwardly and drawing the wire 21 with the same, causing the bell crank 20 to pivot and move the connecting bar 19 downwardly thereby causing the shutter strips 15 to pivot about their respective pivotal centers 16 and allow air to flow between the adjacent edges of the same. As soon as the air flows through the radiator a certain portion of the same will pass through the duct formed by the casing walls 22, 23 and 27, where it comes in contact with substantially the full surface area of the elements 35 and either transfers heat to the same or absorbs heat from the same.

It will be readily understood that the elements 35 will expand or contract in accordance with the temperature of the air passing through the radiator an amount sufficient to keep such air, and consequently the liquid within the radiator, at a predetermined temperature value. Due to the fact that the elements 35 are positioned in the air after it immediately passes through the radiator, they are extremely sensitive and quickly responsive to any temperature difference of air, and the device does not have the relatively great lag in operation so common to the conventional types of thermostatic devices of this type now on the market. Should it be desired to employ the thermostatic device shown in conjunction with a radiator shutter which operates by moving the wire or rod 21 in the opposite direction to that shown, this may be taken care of by removing the screws 28 and nuts 29 and reversing the position of the cover 27 and the bell crank which it supports, and again inserting the screws 28 and securing them in place by the nuts 29, the openings which are provided in the same being spaced to allow this reversal of position. It will also be evident that the top wall 27 may be turned only 90 degrees from the position shown in the drawings if it is found advantageous to so position it. Should a case arise where it is desired to hold the shutter strips 16 in open position independently of the thermostatic elements 35, such as in the case where one of the elements 35 may become ruptured, or for any other reason, the button 56 may be provided on the instrument board of the vehicle for manually controlling the position of the shutter strips 16 independently of the thermostatic operating means.

Although I have shown the present device as being secured directly against the rear face of the radiator it will be evident that substantially the same results may be obtained if it is mounted independently of the radiator and out of contact with the same, and I do not limit myself to the particular mode of support shown. It will also be apparent that instead of the axis of the thermostatic elements 35 being positioned vertically as shown, they may be positioned at any direction which may be found convenient as long as the air from the radiator is caused to pass the same in a plane substantially at right angles to such axis. It will be evident also that the device may be employed to actuate any type of shutters, the type shown in the drawings being for the purpose of illustration only, and other means than the bell crank may be used to transfer the motion of the discs to the device to be actuated. It will further be apparent that the present invention is not limited solely for actuating the shutters for radiators of motor vehicles, but may equally well be employed in connection with such shutters used for controlling the flow of air for any purpose such as in heating systems. It is conceivable also that the device may be used to control thermostatically if placed on the inlet or front side of the heat transfer surface, in which case the temperature of the incoming fluid passing around the thermostatic discs will be the controlling medium.

Should adjustments be necessary to adapt the device for different types of shutters or for different uses, such adjustments may be made by changing the ratio of the lever arms of the bell crank, by varying the number of discs 35, by varying the amount of character of the liquid within the discs 35, by varying the size of the discs 35, the tension of the spring 50, by means of the screw 52, or by the use of shims or vertically adjustable screws positioned in the discs 49 or in the bottom wall 22 in contact with the adjacent thermostatic discs 33. The change of the ratio of the lever arms of the bell crank may be effected to meet any possible conditions by extending the upwardly extending arm as indicated in Fig. 3 and providing a plurality of openings 60 therein for reception of the screw 52. It is also apparent that the device may be placed either at the top or bottom of the radiator or at any intermediate point depending upon the results which are desired to be attained.

Formal changes may be made in the specific embodiment of the invention described without departing from the spirit or substance of the broad invention, the scope of which is commensurate with the appended claims.

What I claim is:

1. In combination, a casing substantially fully open on its front and rear sides and providing a duct for the passage of air through the same, temperature responsive mechanism within said casing transversely with respect to the path of air therethrough and materially restricting said duct but including expansible elements so formed and disposed as to permit horizontal flow of air therebetween, a bell crank supported on said casing, and means connecting one arm of said bell crank with said temperature responsive mechanism whereby expansion of the latter will cause movement of said bell crank, said temperature responsive mechanism reducing the effective cross-sectional area of said casing at that point by at least forty percent.

2. In combination, a casing comprising a pair of side walls connected by a cross wall, a second cross wall removably secured to said side walls and forming between the same and the first mentioned cross wall a duct substantially fully open at front and rear, a heat responsive mechanism supported between said cross walls, and a bell crank operatively connected to said heat responsive mechanism.

3. In combination, a casing comprising a pair of side walls connected together by a bottom wall, said casing being devoid of front and rear walls, temperature responsive mechanism supported on said bottom wall, a top wall, a bell crank supported by said top wall, means operatively connecting said bell crank with said temperature responsive element, and means for securing said top wall to said side walls in a plurality of positions.

4. In combination, a casing comprising a pair of side walls connected together by a bottom wall, attaching flanges on said side walls, temperature responsive mechanism supported on said bottom wall between said side walls, a top wall, a lever pivotally secured to said top wall and operatively connected to said temperature responsive mechanism, and means for removably securing said top wall to said side walls in a variety of positions whereby said lever may be caused to move in different directions upon expansion of said temperature responsive mechanism.

CHRISTIAN R. MUELLER.